Feb. 18, 1930.                J. BECKER                1,747,616
                       AMMONIA RECOVERY PROCESS
                       Filed Aug. 2, 1922        4 Sheets-Sheet 1

Fig. 1

Inventor
Joseph Becker
By: Murray Clark & Carpenter Attys.

Feb. 18, 1930.  J. BECKER  1,747,616
AMMONIA RECOVERY PROCESS
Filed Aug. 2, 1922  4 Sheets-Sheet 3

*Fig. 3*

Inventor:
Joseph Becker
By Munday Clarke & Carpenter
Attys.

Feb. 18, 1930. J. BECKER 1,747,616
AMMONIA RECOVERY PROCESS
Filed Aug. 2, 1922 4 Sheets-Sheet 4

Inventor:
Joseph Becker
By Munday Clark Carpenter
his Attys.

Patented Feb. 18, 1930

1,747,616

UNITED STATES PATENT OFFICE

JOSEPH BECKER, OF PITTSBURGH, PENNSYLVANIA, ASSIGNOR TO THE KOPPERS COMPANY, OF PITTSBURGH, PENNSYLVANIA, A CORPORATION OF PENNSYLVANIA

AMMONIA-RECOVERY PROCESS

Application filed August 2, 1922. Serial No. 579,147.

This invention relates to the recovery of ammonia from ammonia charged gas such as coke oven gas and has for its object the efficient production of ammonia from such gas, the recovery of ammonia being effected with great economy of heat or steam and with simplicity and directness in the operation of the apparatus, and at the same time effecting and maintaining throughout the system a separation of ammonia liquors and condensates containing fixed ammonia compounds and those containing free ammonia compounds, and separately recovering the ammonia from such liquors and separately removing or dissipating the obnoxious constituents from the respective waste liquors and effecting separate disposal of such waste liquors. The improved process, while maintaining a high degree of efficiency in the recovery of the ammonia from the gas, reduces to about one-tenth in volume the waste liquor commonly heretofore required to be evaporated and at the same time makes effective and useful disposal of the rest of the waste liquor.

The problem of the economical disposal of the waste liquor from a coke oven gas ammonia recovery plant has always been very difficult of solution. This waste liquor contains in addition to the calcium chloride resulting from the lime treatment of the fixed ammonia in the still, other impurities such as phenols and cyanogen which prevent the discharge of the waste liquor into an ordinary waste main, because of the contaminating effect of such liquor upon the river water in which it would eventually commingle. In order to avoid the evaporation of this large volume of liquor at great expense, it has been proposed to pipe the liquor to the coke quenching station and largely vaporize it by quenching the coke. This proposal, however, has not met with success because of the presence of the calcium bodies in the liquor which cause it to foam as soon as it contacts with the hot coke, with the result that the quenching of the coke is seriously retarded. The present invention provides for keeping separate the liquors involved in the recovery of ammonia from the ammonia-charged gas and separately distilling and disposing of it in such manner that the fixed ammonia is removed from the gas separately from the free ammonia by a circulation of wash liquor which is kept separate from the liquor involved in the recovery of the free ammonia in all stages of the process, including the final disposal of the separate waste liquors. Consequently the calcium bodies will be present in only a part of the entire volume of liquor and this proportion of the liquor may be reduced to about one-tenth of the entire volume employed in the by-product recovery plant, thereby reducing in like degree the amount of waste liquor required to be specially evaporated, and effecting an enormous saving of heat. Inasmuch as the remainder of the liquor, namely that part which is involved primarily in the cooling of the gas and in the condensation of free ammonia vapors, is distilled without lime treatment and is substantially free from calcium bodies, it may be pumped to the quenching station and there disposed of in the quenching of the coke. The entire volume of liquor is thus effectively disposed of with relatively great economy.

Although herein described as specifically applied to the recovery of ammonia from coke oven gas, the invention may also be applied to the treatment of other ammonia-charged gas, or gas that is otherwise derived from the carbonization of coal, and may also have such other objects and results as are found to obtain in the processes hereinafter described and claimed.

In the accompanying drawings:

Figure 1 is a conventional diagram illustrating an embodiment of the invention in one arrangement of apparatus for practicing its processes;

Fig. 3 is a conventional diagram illustrating an embodiment of the invention in still another arrangement of apparatus for practicing its processes.

Figure 2:
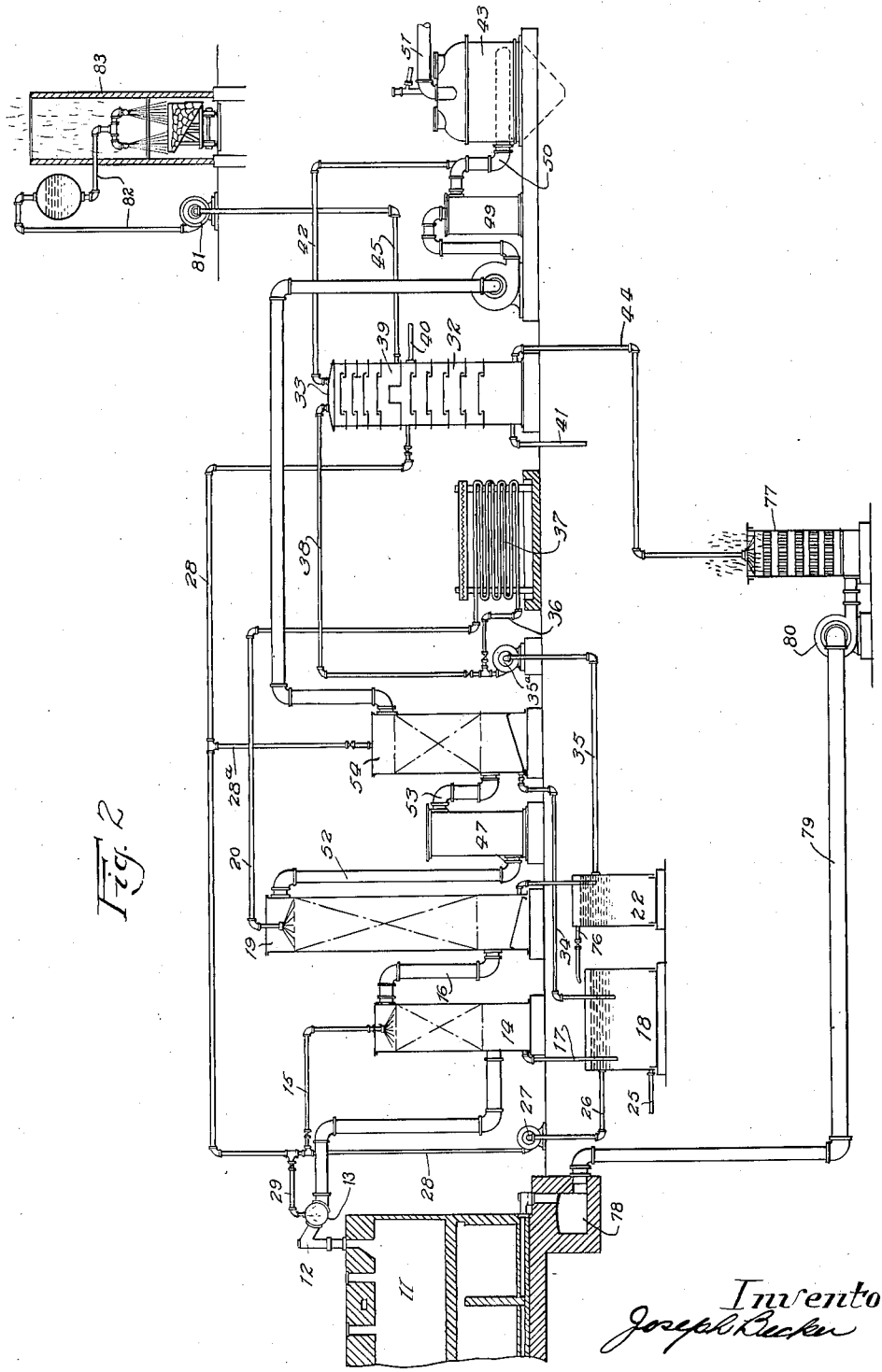
Fig. 2 is a conventional diagram illustrating an embodiment of the invention in another arrangement of apparatus for practicing its processes.

Referring now more particularly to Fig. 1 of the drawings:

There is indicated at 11 a battery of by-product coke ovens, such as those of the well-known Koppers cross-regenerative type, from the coking chambers of which the hot coke oven gas passes through the ascension pipes 12 into the collecting main 13. Passing through the collecting main 13, the coke oven gas is first discharged into the bottom of a hot liquor scrubber 14. This scrubber 14 is of the direct contact type and may be filled with hurdles to promote an intimate interaction between the gas and the wash liquor, which is introduced into the top of the scrubber 14 from the flow pipe 15. In said hot liquor scrubber 14, the coke oven gas flows upwardly in countercurrent with the liquor flowing downwardly through said scrubber, the gas discharging from the top of the scrubber through the gas discharge pipe 16 and the liquor discharging from the bottom of the scrubber through a pipe 17 into the hot drain or settling tank 18. In the collecting main 13 and hot scrubber 14, the mass of the fixed ammonia content, which is ordinarily present in the form of an ammonia salt such as ammonium chloride, is washed out of the gas in the form of condensate and passes with the wash liquor into the hot drain tank 18. The liquid employed for such scrubbing is preferably the aqueous condensate of the gas from such scrubbing operation and the liquid initially employed in the tank 18 for such scrubbing is preferably aqueous condensate of the gas from the same ovens from which the gas being so treated is produced, or from other ovens, and consisting of ammonia liquor which may contain some tar and possibly other constituents condensed out during the scrubbing operation. Although the temperature of the gas drops slightly in the hot liquor scrubber 14, the gas passes out of said scrubber still containing the bulk of its free ammonia content which is present in the gas in the form of vapor. The washing effected in the hot liquor scrubber 14 is not a cooling step, but primarily a washing operation, the gas in the scrubber 14 being cooled just sufficiently to drop below the dew point of the condensate containing the fixed ammonia of the gas, so that the fixed ammonia is washed out of the gas by the wash liquor, without any substantial absorption by the wash liquor of the free ammonia vapors in the gas. In the present illustrative example the temperature of the gases in the scrubber 14 may conveniently be around 70° to 80° C. Inasmuch as the wash liquor employed in the scrubber 14 does not effect cooling of the gas to any great extent nor any substantial absorption of the free ammonia, but is employed primarily to scrub out from the gas the residue of fixed ammonia that has not already been taken out in the collecting main, the volume of this liquor may be reduced to a relatively small proportion of the total volume of liquor involved in the cooling and washing of the gas, for example to approximately one-tenth of the total volume, with the result that only one-tenth of the total volume of waste liquor is required to be evaporated, namely, only the waste portion of that liquor which is circulated separately from the remainder of the liquor and employed primarily to remove the fixed ammonia condensate from the gas.

The gas substantially freed of its fixed ammonia content but still carrying its free ammonia as vapor passes through the discharge pipe 16 into the bottom of a direct cooler 19. The direct cooler 19 may be a gas and liquid direct contact apparatus similar to the hot liquor scrubber 14 but preferably of larger capacity, as indicated in Fig. 1. Passing upwardly through the direct cooler 19 the gas is cooled in the ordinary way by cold liquor which is discharged into the top of the direct cooler 19 from the cold liquor pipe 20. The liquor carrying part of the free ammonia of the gas discharges from the bottom of the direct cooler 19 through a discharge pipe 21 into the drain tank 22, and the cooled gas passes out of the top of the direct cooler 19 into the gas pipe 23 through which it passes to the exhauster 24. As in the case of the tank 18, the liquor initially employed in the tank 22 for spraying the scrubber 19 is aqueous condensate of gas from the same ovens from which the gas being so treated by liquid from tank 22 is produced, or from other ovens, and consisting of ammonia liquor which may contain some tar and possibly other constituents condensed out during the scrubbing operation. In the hot liquor scrubber 14 a part of the tar content of the gas is condensed and passes with the discharged hot wash liquor into the hot drain 18. Here, the tar is allowed to settle out in the bottom and may be drained off and circulated to the tar tank through the tar discharge pipe 25. The wash liquor in the upper part of the tank is drawn off through a pipe 26 by the pump 27 and is pumped through the hot wash liquor line 28 which connects with the valve controlled wash liquor feed line 15 and with a valve controlled branch pipe 29 leading to the collecting main 13. Part of the hot wash liquor, with some of the tar, is sprayed into the gas in the collecting main 13, in order to avoid overheating of the main, and this spraying of the main at the same time effects removal of the bulk of the fixed ammonia from the gas and leaves only a residue to be removed in the hot scrubber 14. This liquor sprayed into the collecting main will ultimately be restored to the fixed ammonia wash liquor part of the system circulating through the hot liquor scrubber 14 and in the tank 18. The remainder of the hot wash liquor flows through the pipe 28 and is partly circulated through a valve controlled branch to a cooling coil 30 and partly through a valve controlled branch 31 to the top of the fixed leg 32 of an ammonia still 33. From the coil 30, which may be of the ordinary water cooled variety the hot wash liquor passes through the pipe 34 back to the hot drain tank 18. The cooling effected by the coil 30 is just sufficient to prevent the temperature of the wash liquor from rising above that required for washing out the fixed ammonia condensate from the gas in the hot liquor scrubber 14.

From the gas main 16, the gas passes into the bottom of and up through the direct cooler 19, in which it is sprayed with cooling liquor from the pipe 20, such liquor with the condensate it gathers in the cooler 19, being discharged through the pipe 21 into the tank 22. The cooling liquor and condensate discharged into the tank 22 through the pipe 21 passes out of said tank through a pipe 35 and is pumped by the pump 35$^a$ partly through a valve controlled branch 36 leading to a cooling coil 37 and partly through a valve controlled branch 38 leading to the top of the free leg 39 of the ammonia still 33. The liquor flowing through the coil 37 is cooled by water flowing over the coil and at the outlet of the coil discharges into the pipe 20 which recirculates the cooling liquor back to the top of the direct cooler 19.

In the lower fixed leg 32 of the still the hot wash liquor carrying the fixed ammonia is commingled with lime milk discharged into the still through the pipe 40 to liberate the ammonia as vapor from the ammonia salt. Steam is applied to the bottom of the still through the steam pipe 41 and circulating in countercurrent with the liquor discharged into the top of the fixed leg 32 and the upper free leg 39 drives off the ammonia vapor from both liquors. The ammonia vapor from the lower fixed leg of the still passes upwardly into the upper free leg and there commingles with the ammonia vapor recovered from the main body of the liquor. The entire body of the ammonia vapor recovered in the still discharges through the ammonia vapor pipe 42 and passes to the saturator 43.

The liquor from the lower fixed leg of the still and containing the lime as calcium chloride is discharged from the bottom of the still through a pipe 44. This liquor which is approximately only about one-tenth of the entire volume of liquor employed is then evaporated in the evaporating tower 77, operated by the waste heat of waste gas drawn from the stack-flue 78, of the ovens, through the pipe-line 79 and fan 80. Such evaporation disposes of the objectionable and the obnoxious constituents of this waste liquor from the fixed leg of the still.

The main body of the waste liquor, that is to say approximately nine-tenths of the total volume of liquor employed is discharged from the bottom of the free leg of the still through the discharge pipe 45. This liquor, although also containing the obnoxious phenols and cyanogen, contains substantially no calcium bodies and may conveniently be disposed of by pumping it through the pump 81 and piping 82, to the quenching station 83 and there employing it for quenching the coke, thereby dissipating the phenols and cyanogen by the heat of the coke.

From the exhauster 24 the gas passes through a pipe 46 into the bottom of a tar extractor 47 in which the residue of the tar is removed from the gas. Passing out of the top of the tar extractor the gas flows through a pipe 48 into a reheater 49 in which the gas is heated and then delivered through a pipe 50 into a saturator 43. In the saturator 43 the gas, and ammonia vapors discharged through the ammonia vapor line 42, are subjected to an acid wash, for example sulphuric acid, for converting the ammonia vapors and the residue of ammonia in the gas to ammonium sulphate, the gas being employed to effect the precipitation of the ammonia as ammonium sulphate in the saturator 43. Discharging out of the saturator 43 the gas passes through a pipe 51 from which it may be subjected to the ordinary final cooling operation and then delivered to the gas holder for subsequent commercial use. The ammonium sulphate precipitated in the saturator 43 is recovered and dried.

In the form of the invention illustrated in Fig. 2, the gas discharged from the top of the direct cooler 19 passes through the pipe 52 directly into the bottom of the tar extractor 47 and from the top of the tar extractor 47 through the pipe 53 directly into the bottom of another direct cooler 54 in which the cooled gas is employed for the purpose of cooling part of the hot wash liquor discharged into the top of the direct cooler 54 through the valve controlled branch line 28$^a$ in order to preserve an equilibrium in the temperature of the wash liquor containing the fixed ammonia compounds. From the bottom of the direct cooler 54 the wash liquor passes to the hot drain tank 18 through the pipe 34. With the above noted exception, the process illustrated diagrammatically in Fig. 2 is the same as that previously described.

Figure 4:
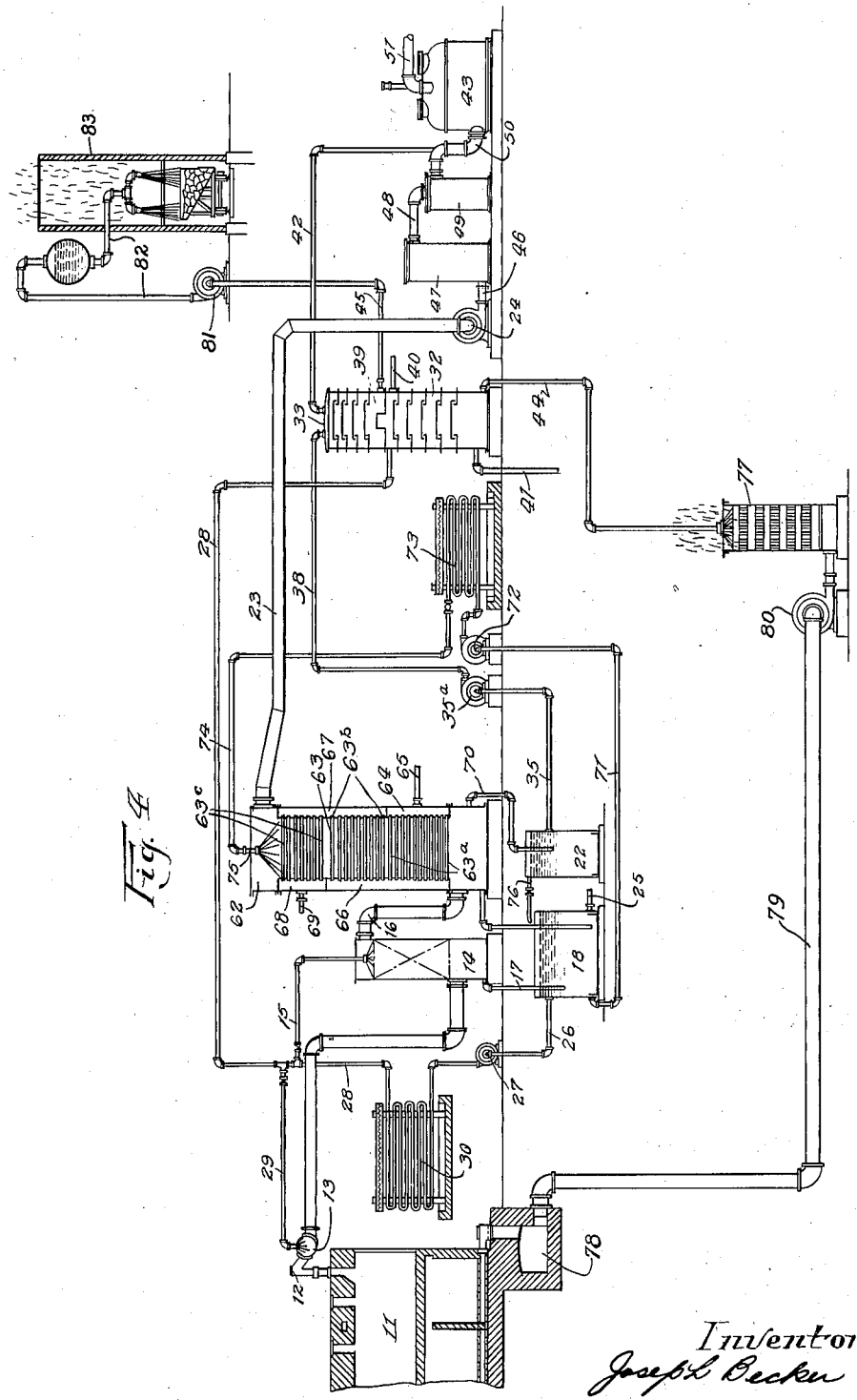
Fig. 4 is a conventional diagram illustrating an embodiment of the invention in still another arrangement of apparatus for practicing its processes.

Figs. 3 and 4 both illustrate processes in which an indirect cooler is employed for cooling the hot gas discharged from the top of the hot liquor scrubber 14. In the form of apparatus illustrated in Fig. 3 the indirect cooler 55 is of the vertical tube variety in which cooling water is circulated through the water tubes 56 from a water inlet 57 in the bottom of the cooler. The water rises in the tubes on one side of the cooler to a reservoir 58 at the top and descends through the tubes on the other side from which it discharges into a baffled reservoir 59 at the bottom and thence into the discharge pipe 60. The hot gas circulates in the space around the tubes 56 and any condensate is discharged into the drain tank 22 through the pipe 61 communicating with the gas chamber of the cooler. In Fig. 4 the indirect cooler of the horizontal water tube variety is employed. The cooler 62 is provided with horizontal water tubes 63 which traverse a central gas circulating chamber. The gas enters the bottom of the cooler through the pipe 16 and passing upwardly through the central chamber of the cooler circulates in contact with the horizontal water tubes 63 and finally emerges through the top through the pipe 23. The water enters a chamber 64 on one side of the cooler through an inlet pipe 65, passes through the lower tubes 63$^a$ to a chamber 66 on the other side, thence through the intermediate tubes 63$^b$ to a chamber 67 above the chamber 64 and thence back through the upper tubes 63$^c$ to a chamber 68 above chamber 66. From chamber 68 the water discharges through a discharge pipe 69. The condensate from the bottom of the central gas circulating chamber discharges through a pipe 70 into the drain tank 22. If desired, in the form of the invention shown in Fig. 4, the tar which settles out in the bottom of the hot drain tank 18 may be pumped through a tar line 71 by a pump 72 through a cooling coil 73 and thence conveyed by a tar line 74 to a spray 75, from which the tar is sprayed into the gas rising in the central chamber of the indirect cooler 62. This facilitates the removal of any tar and napthalene from the gas and such tar will flow with the condensate through the discharge pipe 70 into the tank 22 and there settle out in the bottom.

When indirect coolers are employed for cooling the gas, the liquor containing any free ammonia condensed in the cooling of the gas may be greatly reduced in volume thus requiring less liquor to be handled in the free leg of the ammonia still. The volume of the liquor carrying the fixed ammonia absorbed from the gas in the main 13 and scrubber 14 remains the same as previously described. In the forms of the invention illustrated in Figs. 3 and 4 the cooler 30 for maintaining the equilibrium of temperature of the fixed ammonia wash liquor may conveniently be interposed in the pipe line 28 between the pump 27 and the branch line leading to the top of the hot liquor scrubber 14.

In all forms of the invention it is preferable to provide a valve controlled overflow pipe 76 leading from the top of the drain tank 22 and adapted to discharge in the top of the hot drain tank 18. This permits the optional discharge of controlled quantities of the liquor from the free ammonia circulation system to the fixed ammonia wash liquor system, for example, in making up the fixed ammonia wash liquor system after a discontinuance of the latter for any cause.

The separate circulation, distillation and discharge and disposition of the liquor that takes the fixed ammonia and of the liquor that takes free ammonia from the gas, provides an efficient, practical and economical method of recovering ammonia from the condensates and disposing of the objectionable and the obnoxious constituents in the waste liquors without pollution of sewers or streams.

The invention as hereinabove set forth may be variously embodied within the scope of the claims hereinafter made.

I claim:

1. In a process for the recovery of ammonia from coke oven gas, the combination of steps that consists in: washing the hot gas from the coke ovens by passing it in direct contact with wash liquor and thereby removing the fixed ammonia content from the gas; then cooling the gas by bringing it into direct contact with a separate circulation of cooling liquor; subjecting the hot wash liquor and the cooling liquor to separate distilling operations and separately discharging the waste liquor therefrom; removing the residue of the tar from the gas; and conducting the gas and the still vapors from both distilling operations to and through a saturation bath to recover the ammonia; substantially as specified.

2. In a process for the recovery of ammonia from ammonia charged gas, the combination of steps that consists in: washing hot ammonia charged gas by passing it in direct contact with wash liquor and thereby removing the fixed ammonia content from the gas; then cooling the gas by bringing it into direct contact with a separate circulation of cooling liquor; subjecting the hot wash liquor and the cooling liquor to separate distilling operations and separately discharging the waste liquor therefrom; removing the residue of the tar from the gas; and conducting the gas and the still vapors from both distilling operations to and through a saturation bath to recover the ammonia; substantially as specified.

3. In a process for the recovery of ammonia from coke oven gas, the combination of steps that consists in: washing the hot gas from the coke ovens by passing it in direct contact with wash liquor and thereby removing the fixed ammonia content from the gas; then cooling the gas and discharging any ammonia condensate separately from the wash liquor; subjecting the hot wash liquor and the condensate to separate distilling operations and separately discharging the waste liquor therefrom; removing the residue of the tar from the gas; and conducting the gas and distilled vapors from both distilling operations to and through a saturation bath to recover the ammonia; substantially as specified.

4. In a process for the recovery of ammonia from ammonia charged gas, the combination of steps that consists in: washing hot ammonia charged gas by passing it in direct contact with wash liquor and thereby removing the fixed ammonia content from the gas; then cooling the gas and discharging any ammonia condensate separately from the wash liquor; subjecting the hot wash liquor and the condensate to separate distilling operations and separately discharging the waste liquor therefrom; removing the residue of the tar from the gas; and conducting the gas and still vapors from both distilling operations to and through a saturation bath to recover the ammonia; substantially as specified.

5. In a process for the recovery of ammonia from coke oven gas, the combination of steps that consists in: washing the hot gas from the coke ovens by passing it in direct contact with wash liquor and thereby removing the fixed ammonia content from the gas; then cooling the gas by bringing it into contact with a separate circulation of cooling liquor thereby recovering free ammonia; and subjecting the hot wash liquor and the cooling liquor to separate distilling operations for the recovery of ammonia and separately discharging the waste liquor therefrom; substantially as specified.

6. In a process for the recovery of ammonia from ammonia charged gas, the combination of steps that consists in: washing hot ammonia charged gas by passing it in direct contact with wash liquor and thereby removing the fixed ammonia content from the gas; then cooling the gas by bringing it into direct contact with a separate circulation of cooling liquor thereby recovering free ammonia; and subjecting the hot wash liquor and the cooling liquor to separate distilling operations for the recovery of ammonia and separately discharging the waste liquor therefrom; substantially as specified.

7. In a process for the recovery of ammonia from ammonia charged gas, the combination of steps that consists in: washing hot ammonia charged gas by passing it in direct contact with wash liquor and thereby removing the fixed ammonia content from the gas; then cooling the gas and discharging any ammonia condensate separately from the hot wash liquor; and subjecting the hot wash liquor and the condensate to separate distilling operations for the recovery of ammonia and separately discharging the waste liquor therefrom; substantially as specified.

8. In a process for the recovery of ammonia from coke oven gas, the improvement characterized by washing the hot gas from the coke ovens by passing it in direct contact with wash liquor and thereby removing the fixed ammonia from the gas, then cooling the gas by bringing it into direct contact with a separate circulation of cooling liquor; recovering the ammonia by separately distilling the hot wash liquor and the cooling liquor; separately discharging the waste liquors from the separate distillations; evaporating the waste liquor from the hot wash liquor distillation; and purifying the waste liquor from the cooling liquor distillation by employing it in the quenching of incandescent coke; substantially as specified.

9. In a process for the recovery of ammonia from ammonia charged gas, the improvement characterized by washing hot ammonia charged gas from the gasifier by passing it in direct contact with wash liquor and thereby removing the fixed ammonia from the gas, then cooling the gas by bringing it into direct contact with a separate circulation of cooling liquor; recovering the ammonia by separately distilling the hot wash liquor and the cooling liquor; separately discharging the waste liquors from the separate distillations; evaporating the waste liquor from the hot wash liquor distillation; and purifying the waste liquor from the cooling liquor distillation by employing it in the quenching of incandescent coke; substantially as specified.

10. In a process for the recovery of ammonia from ammonia charged gas, the improvement characterized by washing the hot ammonia charged gas by passing it in direct contact with wash liquor and thereby removing the fixed ammonia content from the gas, then cooling the gas and discharging the condensate separately from the hot wash liquor; recovering the ammonia by separately distilling the hot wash liquor and the condensate; separately discharging the waste liquors from the separate distillations; evaporating the waste liquor from the hot wash liquor distillation; and purifying the waste liquor from the condensate distillation by employing it in the quenching of incandescent coke; substantially as specified.

11. In the process of recovering ammonia from ammonia charged gas, the combination of steps consisting in separately recovering the fixed ammonia liquor and the free ammonia liquor in successive steps of hot washing treatment and cooling of the gas current, respectively; separately distilling the two ammonia liquors for the recovery of ammonia; and separately discharging the two respective waste liquors for further disposition; substantially as specified.

12. In a process of recovering ammonia from ammonia-charged gas, the combination of steps of separately recovering the fixed ammonia liquor and the free ammonia liquor in successive steps of hot washing treatment and cooling of the gas current, respectively; distilling the fixed ammonia liquor and returning the ammonia vapor to the gas current; separately disposing of the waste liquor from such distillation; and separately treating the free ammonia liquor to recover therefrom its free ammonia and to dispose of its residual waste liquor apart from the aforesaid waste liquor from the fixed ammonia liquor distillation, substantially as specified.

13. In a process of recovering ammonia from ammonia charged gas containing fixed ammonia and other condensable constituents, the combination of steps comprising separately dissolving, at a temperature above the volatilization temperature of free ammonia, the fixed ammonia of the gas in a part of aqueous condensate condensed from the gas, subjecting the aqueous condensate to indirect cooling and recirculating it in a cyclic manner for further dissolving of fixed ammonia and subsequent cooling, withdrawing condensate from said circulation for further disposition, subjecting the so treated gas to further cooling to condense and remove other condensable constituents from the gas and disposing of condensate from said further cooling of the gas separately from the condensate from said circulation.

In testimony whereof I have hereunto set my hand.

JOSEPH BECKER.